US009931946B2

(12) United States Patent
Storm

(10) Patent No.: US 9,931,946 B2
(45) Date of Patent: Apr. 3, 2018

(54) METHOD AND ARRANGEMENT FOR CONTROLLING CHARGING OF AN ENERGY STORAGE SYSTEM

(71) Applicant: VOLVO TRUCK CORPORATION, Göteborg (SE)

(72) Inventor: Jonas Storm, Hisings Backa (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/891,343

(22) PCT Filed: May 15, 2013

(86) PCT No.: PCT/EP2013/001434
§ 371 (c)(1),
(2) Date: Nov. 14, 2015

(87) PCT Pub. No.: WO2014/183771
PCT Pub. Date: Nov. 20, 2014

(65) Prior Publication Data
US 2016/0121734 A1 May 5, 2016

(51) Int. Cl.
*B60L 11/18* (2006.01)
*B60L 3/00* (2006.01)
(Continued)

(52) U.S. Cl.
CPC .............. *B60L 11/1801* (2013.01); *B60L 3/00* (2013.01); *B60L 3/0069* (2013.01); *B60L 11/12* (2013.01);
(Continued)

(58) Field of Classification Search
CPC .............. B60L 11/1838; B60L 11/1844; B60L 2230/16; B60L 11/1816; B60L 11/1801; Y02T 90/128
See application file for complete search history.

(56) References Cited

U.S. PATENT DOCUMENTS 5,204,611 A * 4/1993 Nor ...................... H02J 7/0086
320/145
5,498,948 A 3/1996 Bruni et al.
(Continued)

FOREIGN PATENT DOCUMENTS

CN 1751910 A 3/2006
DE 102011086497 A1 * 5/2013
(Continued)

OTHER PUBLICATIONS

International Search Report (dated Feb. 6, 2014) for corresponding International App. PCT/EP2013/001434.
(Continued)

*Primary Examiner* — Behrang Badii
*Assistant Examiner* — David A Testardi
(74) *Attorney, Agent, or Firm* — WRB-IP LLP

(57) ABSTRACT

A method is provided for controlling charging of an energy storage system in a vehicle including an electric machine which is arranged for propulsion of the vehicle. The method includes initiating the charging upon connection of the energy storage system to an external power supply via connector elements; and transmitting, between the vehicle and the external power supply, a control signal including data related to the charging by a wireless transmission link. The method furthermore includes evaluating whether the control signal is received; and terminating the charging in the event that the control signal is not received. An arrangement for controlling charging of an energy storage system is also provided.

16 Claims, 3 Drawing Sheets

(51) Int. Cl.
  *B60L 11/12* (2006.01)
  *B60W 20/13* (2016.01)
  *B60L 5/24* (2006.01)
  *B60W 10/26* (2006.01)

(52) U.S. Cl.
  CPC .......... *B60L 11/182* (2013.01); *B60L 11/185* (2013.01); *B60L 11/1816* (2013.01); *B60L 11/1824* (2013.01); *B60L 11/1838* (2013.01); *B60L 11/1844* (2013.01); *B60L 11/1846* (2013.01); *B60L 11/1848* (2013.01); *B60W 20/13* (2016.01); *B60L 5/24* (2013.01); *B60L 2200/18* (2013.01); *B60L 2230/16* (2013.01); *B60W 10/26* (2013.01); *B60Y 2200/143* (2013.01); *Y02T 10/7005* (2013.01); *Y02T 10/7077* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y02T 90/169* (2013.01); *Y04S 30/14* (2013.01); *Y10S 903/903* (2013.01)

(56) References Cited

U.S. PATENT DOCUMENTS

| | | | | |
|---|---|---|---|---|
| 5,548,200 | A * | 8/1996 | Nor | B60L 11/184 320/106 |
| 5,565,755 | A * | 10/1996 | Keith | B60L 1/08 219/202 |
| 5,596,258 | A * | 1/1997 | Kimura | B60L 3/0084 320/109 |
| 6,456,041 | B1 * | 9/2002 | Terada | B60L 11/1861 320/132 |
| 6,792,259 | B1 * | 9/2004 | Parise | B01F 5/0614 320/109 |
| 8,125,183 | B2 * | 2/2012 | Katsunaga | B60L 11/1816 320/104 |
| 8,890,475 | B1 * | 11/2014 | Becker | B60L 11/1827 180/65.29 |
| 9,365,128 | B2 * | 6/2016 | Sarkar | B60L 3/04 |
| 2008/0007220 | A1 * | 1/2008 | Bolgiani | B60K 6/445 320/128 |
| 2008/0277173 | A1 * | 11/2008 | Midrouillet | B60K 1/04 180/65.1 |
| 2009/0121678 | A1 * | 5/2009 | Mitake | B60L 5/42 320/109 |
| 2011/0022222 | A1 * | 1/2011 | Tonegawa | B60L 8/003 700/232 |
| 2011/0078092 | A1 | 3/2011 | Kim et al. | |
| 2011/0196545 | A1 * | 8/2011 | Miwa | B60K 6/445 700/292 |
| 2013/0257150 | A1 * | 10/2013 | Kawasaki | B60L 11/1811 307/10.1 |
| 2013/0313895 | A1 * | 11/2013 | Asselin | B60L 11/182 307/9.1 |
| 2014/0021912 | A1 * | 1/2014 | Martin | B60L 11/1833 320/109 |
| 2014/0021913 | A1 * | 1/2014 | Martin | B60L 11/1838 320/109 |
| 2014/0021914 | A1 * | 1/2014 | Martin | H02H 5/045 320/109 |
| 2014/0239879 | A1 * | 8/2014 | Madsen | H02J 7/0054 320/104 |
| 2014/0239891 | A1 * | 8/2014 | Martin | B60L 11/182 320/108 |
| 2016/0075250 | A1 * | 3/2016 | Lennevi | B60L 3/0023 701/22 |

FOREIGN PATENT DOCUMENTS

| | | |
|---|---|---|
| FR | 2931314 A1 | 11/2009 |
| FR | 2970125 A1 | 7/2012 |
| JP | 11234809 A * | 8/1999 |
| JP | 2008120357 | 5/2008 |
| JP | 2012010447 | 1/2012 |
| JP | 2013243855 A * | 12/2013 |
| WO | 2010003021 A2 | 1/2010 |
| WO | 2011139680 A2 | 11/2011 |

OTHER PUBLICATIONS

International Preliminary Report on Patentability (dated Aug. 17, 2015) for corresponding International App. PCT/EP2013/001434.
Chinese Official Action (dated Jan. 4, 2017) for corresponding Chinese App. 201380076608.6 (International Style Search Report on p. 8).
Japanese Official Action (dated Apr. 28, 2017) for corresponding Japanese App. 2016-513231.
Columbian Official Action (dated Jan. 26, 2018) for corresponding Columbian App. 15-294.253.

* cited by examiner

METHOD AND ARRANGEMENT FOR CONTROLLING CHARGING OF AN ENERGY STORAGE SYSTEM

BACKGROUND AND SUMMARY

The present invention relates to a method for controlling charging of an energy storage system in a vehicle comprising an electric machine which is arranged for propulsion of said vehicle, said method comprising: initiating said charging upon connection of said energy storage system to an external power supply via connector elements; and transmitting, between said vehicle and said external power supply, a control signal comprising data related to said charging by means of a wireless transmission link.

The present invention also relates to an arrangement for controlling charging of an energy storage system in a vehicle comprising an electric machine which is arranged for propulsion of said vehicle, said arrangement comprising an external power supply arranged for initiating charging upon connection of said energy storage system to the external power supply via connector elements, and a transmitter unit and receiver unit arranged for wirelessly transmitting a control signal comprising data related to said charging between said vehicle and said external power supply.

In the field of vehicles, there is a steady increase in research and development related to propulsion of vehicles with alternative power sources, i.e. power sources being used as alternatives to conventional internal combustion engines.

An internal combustion engine, for example in the form of a gasoline engine or a diesel engine, offers high efficiency with relatively low fuel consumption. However, environmental concerns have led to an increase in development of more environmental-friendly power sources for vehicles. In particular, the development of electrically operated vehicles has emerged as a promising alternative.

Today, there exist various types of vehicle propulsion systems comprising electric machines. For example, a vehicle can be operated by means of an electric machine solely, or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen.

The technology involved in electrically operated vehicles is closely related to the development of electrical energy storage systems, for example in the form of battery-related technology for vehicles. Today's electrical energy storage systems for vehicles may comprise a set of rechargeable battery cells which, together with control circuits, forms a unit which is arranged in a vehicle and which is configured for operating an electric machine. A hybrid vehicle is also often arranged so that the energy storage system is charged during braking, by means of a process known as regenerative braking.

A vehicle being operated by means of an internal combustion engine and an electric machine supplied with power from a rechargeable electrical energy storage system is sometimes referred to as a plug-in hybrid electric vehicle (PHEV). A plug-in hybrid electric vehicle uses an energy storage system with rechargeable batteries or another suitable energy source which can be restored into a condition involving a full charge through a connection to an external electric power supply.

The external power supply can be in the form of the common electric grid power system which can be accessed via a conventional power cord, or can be in the form of other arrangements depending on the vehicles involved and the power need for the recharging process. In case of vehicles in the form of buses or heavy transport vehicles, more powerful charging devices and procedures are normally needed as compared with smaller cars and similar vehicles.

A challenge for today's electrically driven vehicles, in particular heavy vehicles such as buses and trucks, is that a high amount of energy must be charged into the energy storage system in a relatively short time in order to optimize the vehicle's range of driving. For this reason, the actual charging of the energy storage system is suitably implemented through a process in which a control unit on the vehicle requests a charging to be carried out by means of an external electric power supply. This is carried out after the energy storage system and the external power supply have been electrically connected by means of suitable connector elements. In such cases, a so-called pantograph can for example be used to connect the onboard energy storage system with an external power supply.

The recharging of an energy storage system in a bus, for example, may involve charging an electrical energy storage system comprising a number of battery cells with a charging current which is of the magnitude 200 A, whereas the electrical energy storage system may have a voltage of the magnitude of 600 V. Such a charging procedure involves certain safety risks, for example if the battery cells are exposed to excessive heat, impact or overcharging, or if electrically conducting parts of the energy storage system or charging system come into contact with persons. A particular situation in which there may arise a safety risk is if the vehicle should move out of its position during the charging procedure. Consequently, there are demands for protection of persons and material in the event of any error which may occur during charging.

Also, the battery cells of the energy storage system are both very expensive and also very sensitive to overcharging. This also means that overcharging of the energy storage system must not occur.

Consequently, there is a demand for methods and arrangements by means of which the charging of an energy storage system in a hybrid vehicle can be carried out in a secure manner, in particular in the event that unexpected changes in certain parameters and conditions (such as the position of the vehicle, the temperature of the energy storage system etc.) should arise. In such situations, it is important that the charging procedure does not lead to any safety risks.

The patent document US 2011/078092 discloses a method and apparatus for controlling a battery. The apparatus is arranged for establishing a wireless communication link in order to transmit data related to battery charge management. The apparatus also comprises a controller arranged for generating a control signal comprising information related to a target capacity of an electric vehicle battery.

Even though the above-mentioned solution according to US 2011/078092 offers a reliable solution for controlling the charging procedure in a vehicle with electric propulsion, there are still further demands for a sufficiently high level of safety for persons and for electric equipment during charging of an energy storage system, in particular in hybrid vehicles.

It is desirable to provide an improved method and arrangement by means of which the above-mentioned problems can be overcome and, in particular, by means of which a charging procedure can be monitored and controlled in the event that any unexpected errors should occur.

In accordance with an aspect of the invention, a method is provided for controlling charging of an energy storage system in a vehicle comprising an electric machine which is arranged for propulsion of said vehicle, said method comprising: initiating said charging upon connection of said energy storage system to an external power supply via connector elements; and transmitting, between said vehicle and said external power supply, a control signal comprising data related to said charging by means of a wireless transmission link. The method furthermore comprises:

evaluating whether said control signal is received; and terminating said charging in the event that said control signal is not received.

By means of a method as defined above, there is provided a method for charging an energy storage system in which a very high degree of safety is obtained. In particular, the fact that the invention comprises an evaluation whether the control signal is received or not allows the charging to be discontinued in a number of situations which can be perceived as being a risk as regards personal safety or damage to goods and objects.

Preferably, the control signal is transmitted from said vehicle to said external power supply, wherein said evaluating is carried out in the external power supply.

Furthermore, the control signal can be in the form of a modulated radio signal which is transmitted by means of a radio transmitter unit in the vehicle; wherein the control signal is received by means of a radio receiver unit in the external power supply. The radio signal can be transmitted and received by means of a wireless short-range radio network.

The control signal is provided in different forms, suitably in at least one of the following forms:

i) a generally continuous signal having a predetermined frequency and/or amplitude;

ii) a generally pulse-shaped signal with a predetermined pulse width and/or amplitude; and iii) a repeated sequence comprising a signal as defined in i) or ii) and a pause of predetermined length.

Consequently, the control signal can be designed in a number of ways depending on the type of equipment used as a receiving unit, in order to carry out the detection of the control signal in a simple and efficient manner.

Also, the control signal is configured so as to contain certain data related to the charging of the energy storage system, in particular so that the control signal can be used to terminate the charging depending on the current values of at least one of the following parameters:

i) the current position of said vehicle;

ii) any occurring movement of said vehicle;

iii) the identity of said vehicle;

iv) the electrical isolation of said electrical storage system;

v) the status of contact elements of high voltage components of said vehicle;

vi) the charging current;

vii) the charging voltage; and viii) the temperature of said connector elements.

By using input in the form of at least one of the above-mentioned parameters, the transmission of the control signal can be used to terminate the charging process in the event that said at least one parameter deviates from a predetermined value.

Furthermore, according to an embodiment, the invention can be arranged to generate an alarm signal in the event that said charging is terminated due to the control signal not being received.

According to a particular embodiment, the invention can be arranged for providing a predetermined modulation of said control signal; and evaluating whether the charging supplied to said energy storage system comprises said predetermined modulation; and, if this is not the case, indicating that said charging of the energy storage system is erroneous. Suitably, the invention may comprise disconnecting the energy storage system from the external power supply in the event that said charging is terminated.

The above-mentioned problem is also solved by means of an arrangement for controlling charging of an energy storage system in a vehicle comprising an electric machine which is arranged for propulsion of said vehicle, said arrangement comprising an external power supply arranged for initiating charging upon connection of said energy storage system to the external power supply via connector elements, and a transmitter unit and receiver unit arranged for wirelessly transmitting a control signal comprising data related to said charging between said vehicle and said external power supply. The arrangement is configured for evaluating whether said control signal is received in said receiver unit and for terminating said charging in the event that said control signal is not received.

An advantage with the invention is that it provides a fast and reliable transfer of information related to commands for shutting down the charging of the energy storage system. This is provided by transmission, in a wireless manner, of a control signal in the form of a radio communication carrier wave.

If the carrier wave is not received in a proper manner, due to a high voltage-related error having been discovered in the vehicle, or due to any occurring interference or disturbance on the communication link, this should be interpreted as a command to terminate the charging of the energy storage system.

The invention can be implemented in a manner in which the control signal is transmitted from the vehicle to the external power supply or, inversely, from the external power supply to the vehicle.

The term "charging pattern" as used below refers to a predetermined schedule, sequence or progression of the recharging process of the energy storage system. Such a charging pattern can for example be in the form of a "quick charge", i.e. involving a relatively high charging current during a relatively short time period, or a "standard charge", i.e. involving a lower charging current during a relatively long time period. A charging pattern of the "quick charge" type can for example be suitable for recharging the energy storage system of a bus while the bus is being parked briefly during a lunch break or between two consecutive rounds. Consequently, a "charging pattern" is a charging sequence with a certain charging current and voltage which occurs for a certain time or until a certain state of charge has be achieved by the energy storage system Furthermore, the term "modulation" refers to any predetermined variation, deviation or adaptation of the charging current or charging voltage which can be controlled by the vehicles control unit and requested to be supplied from the external power supply. According to a particular embodiment which is described below, such a "modulated" charging pattern can subsequently be detected and evaluated by the vehicles control unit in order to determine whether the charging supplied by the external power supply corresponds to the requested charging. Any difference between the requested charging pattern and the supplied charging pattern can be interpreted as an error of the charging process.

BRIEF DESCRIPTION OF DRAWINGS

The invention will now be described with reference to an embodiment and with reference to the appended drawings, wherein.

DETAILED DESCRIPTION

Figure 1:
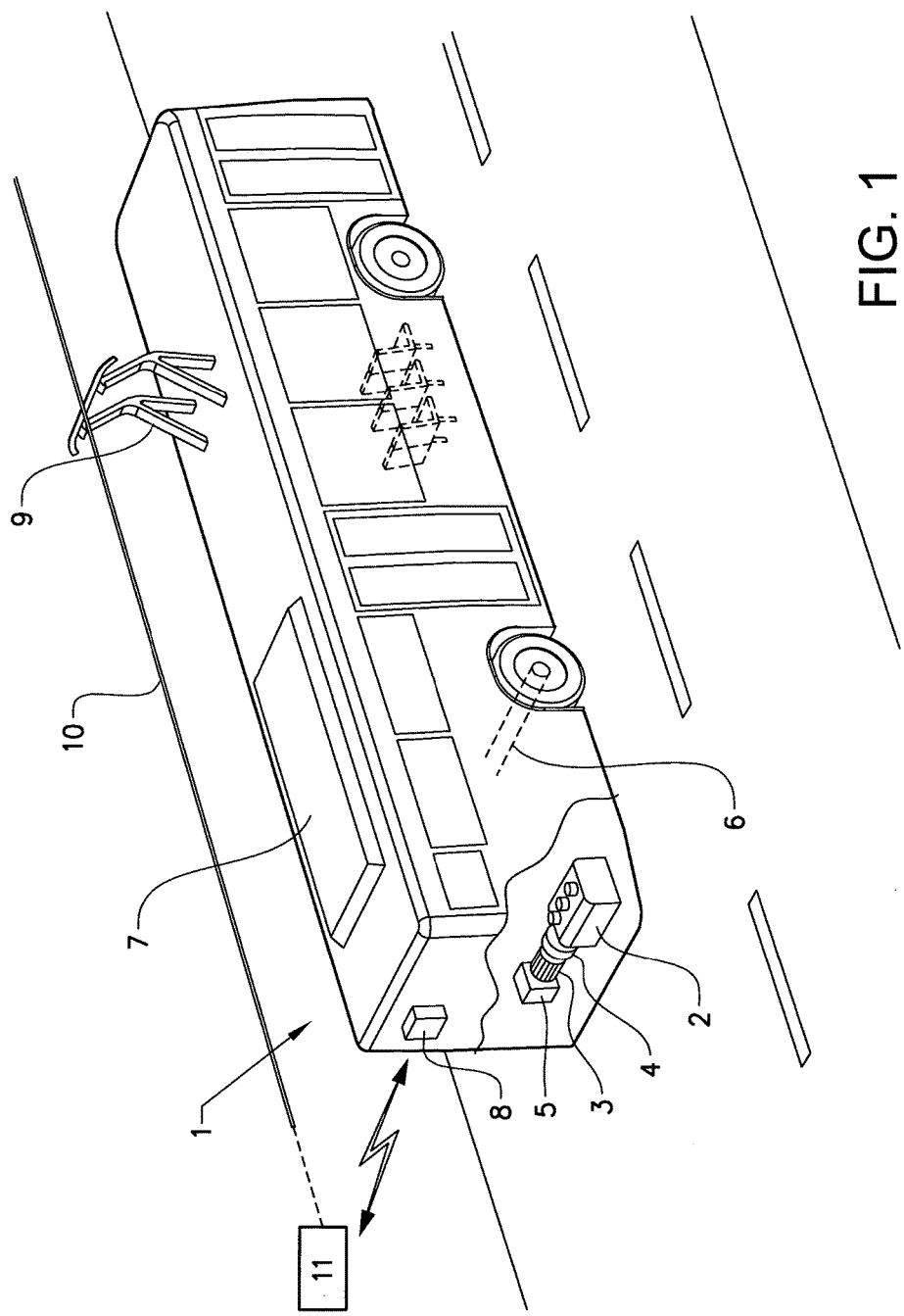
FIG. 1 shows a schematical view of a hybrid vehicle in the form of a bus, in which the present invention can be used.

The invention will now be described with reference to an embodiment and the enclosed drawings. With reference initially to FIG. 1, there is shown a simplified perspective view of a vehicle in the form of a bus 1 which according to an embodiment is of hybrid type. More precisely, the bus 1 is of the plug-in hybrid type which is equipped with an internal combustion engine 2 and an electric machine 3 which are connected to each other via a clutch 4 and wherein both the internal combustion engine 1 and the electrical machine 2 can be used to drive the bus 1.

Even though the invention is described with reference to a vehicle in the form of a bus, it can be used for virtually any type of vehicle which is operated by means of at least an electric machine.

With reference to FIG. 1, the electric machine 3 is connected to a gearbox 5, which in turn is connected to a rear axle 6 of the bus 1. In a manner which is known as such, the internal combustion engine 2 and the electric machine 3 can be used for driving the rear axle 6. The electric machine 3 is according to the embodiment used as a combined electric drive motor and generator, and is suitably also used as a starter motor for the internal combustion engine 2.

The bus 1 carries an electric energy storage system 7 which comprises a set of battery cells and other control circuits. Due to its size and width, it is suitable to arrange the energy storage system 7 on the roof of the bus 1, as indicated in FIG. 1. The energy storage system 7 comprises a number of battery cells which are connected in series to provide an output DC voltage having a desired voltage level. Suitably, the battery cells are of lithium-ion type but other types may also be used. The energy storage system 7 also comprises control circuits adapted for monitoring the operation of the battery cells.

The various above-mentioned components of the propulsion system of the bus 1 are connected to a vehicle control unit 8, which will be described in greater detail below.

During certain modes of operation of the bus 1, it is suitable to use only the electric machine 3 for operating the bus 1. This means that the energy storage system 7 will deliver the required power to the electric machine 3, which in turn is driving the rear axle 6. During other modes of operation of the bus 1, for example when the state of charge of the energy storage system 7 is determined as not being sufficient for operating the bus 1 by means of the electric machine 3, the internal combustion engine 2 is connected, via the clutch 4 and the gearbox 5, to the rear axle 6. The manner in which an electric machine and an internal combustion engine can be used for operating a vehicle is generally previously known and for this reason, it is not described in any greater detail here.

Furthermore, the bus 1 is equipped with an electric connector element 9, suitably in the form of a pantograph which is mounted on the roof of the bus 1. The pantograph 9 is arranged for being connected to a further connector element 10 in the form of an overhead electrical conductor wire which conducts a charging current with a certain voltage.

A pantograph is an electrical connector device which can be positioned on the roof of a bus, a tramway car or similar, and which is adapted to be raised so as to assume an elevated condition in which it comes into contact with an electrically conducting wire or rail being positioned over the vehicle. In the context of the present invention, the energy storage system 7 can be supplied with an electrical current, by means of the connection between the overhead wire 10 and the pantograph 9, in order to charge the energy storage system 7.

According to the embodiment, the connector elements 9, 10 are arranged so that charging of the energy storage system 7 takes place while the bus 1 is standing still, i.e. either at a terminal facility or at a bus stop or a similar position. Furthermore, the conductive wire 10 forms part of an external power supply 1, as indicated in a schematic manner in FIG. 1. The external power supply 11 is generally configured for feeding a certain charging current with a charging voltage to the conductive wire 10.

As will be described in greater detail below, the vehicle control unit 8 and the external power supply 11 are arranged for wireless communication. To this end, both the vehicle control unit 8 and the external power supply 11 are equipped with wireless communication units, as will be described with reference to FIG. 2.

Figure 2:
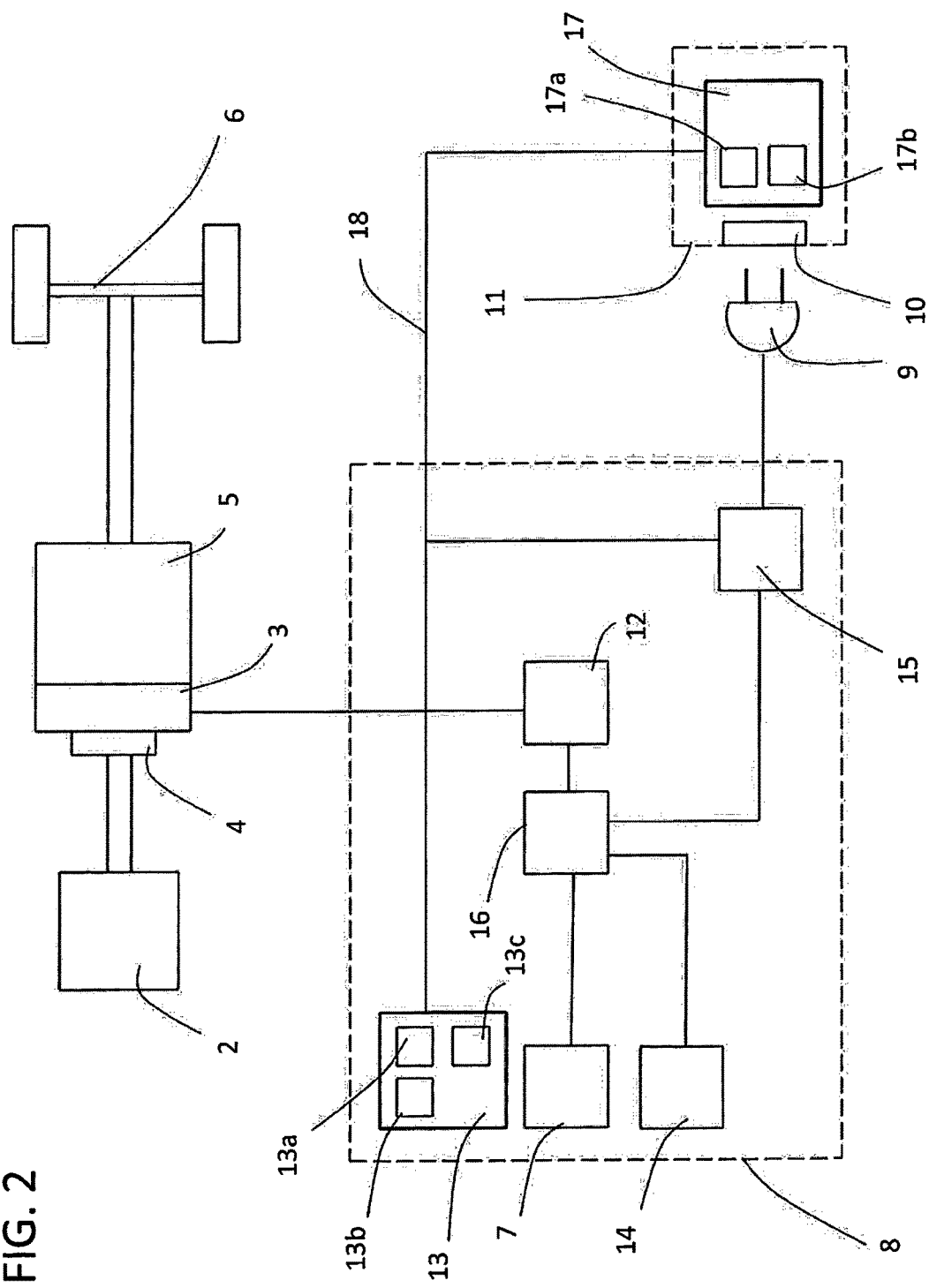
FIG. 2 is a diagram showing an arrangement in accordance with the invention.

FIG. 2 is a schematic diagram of the main components forming part of the invention. Components occurring both in FIG. 1 and FIG. 2 are indicated with the same reference numerals. Accordingly, the bus 1 is operated by means of an arrangement comprising an internal combustion engine 2 and an electric machine 3 which are connected via a gearbox 5 to the rear axle 6 of the bus 1. The electric machine 3 is arranged for being used as a starter motor, a generator or as an electric machine being provided with an operating voltage from the energy storage system 7.

The electric machine 3 is controlled by means of an electric motor drive unit 12, which forms part of the vehicle control unit 8 (cf. FIG. 1). The vehicle control unit 8 also comprises a hybrid control unit 13 which is arranged for controlling the charging procedure of the energy storage system 7, as will be described in greater detail below. Furthermore, the vehicle control unit 8 comprises a DC/DC-converter 14 which is configured for convening the direct current (DC) from the energy storage system 7 from one voltage level to another, for example from approximately 200 V of the energy storage system 7 to approximately 24 V which can be used for operating accessories such as lights and other electric devices in the vehicle.

The vehicle control unit 8 also comprises a disconnector unit 15 arranged to be able to disconnect the two connector elements 9, 10 from each other, if needed. Such a need may arise in the event that an error occurs during the charging, as will be described below.

The invention is based on the principle that a control signal is transmitted in a wireless manner between the hybrid control unit 13 in the bus 1 and the external power supply 11. There is also provided means for evaluating the transmission of the control signal and determining whether it is actually received in a manner as expected. According to an embodiment, the control signal is transmitted from the hybrid control unit 13 to the external power supply 11. This means that the external power supply 11 is configured for determining whether it receives the control signal. If no control signal is received, the charging of the energy storage system 7 is terminated.

In FIG. 2, the connector elements 9, 10 are schematically depicted in the form of a plug and a socket. However, as disclosed in connection with the embodiment shown in FIG. 1, the connector elements 9, 10 are suitably in the form of a pantograph 9 and a conductive wire 10. The two connector elements can alternatively be formed by other conductive elements or even inductive elements as an alternative to conductive elements in the form of a pantograph and conductive wire.

Furthermore, the vehicle control unit 8 comprises a junction box 16 to which the energy storage system 7, the hybrid control unit 13, the DC/DC converter 14, the electric motor drive unit 12 and the disconnector unit 15 are connected. Also, the external power supply 11 comprises a charger control unit 17 being arranged for controlling the process of charging of the energy storage system 7, as will be described below.

During normal driving, the pantograph 9 is not connected to any external power supply. When recharging of the energy storage system 7 is required, the bus 1 is parked underneath the conductive wire 10 and the pantograph 9 is positioned so that it comes into contact with the conductive wire 10.

When the bus 1 is in a position in which the pantograph 9 is in contact with the conductive wire 10, the energy storage system 7 is consequently in contact with the external power supply 11. This means that the vehicle control unit 8 of the bus 1 may then request charging from the external power supply 11. This is obtained by means of transmitting data messages, on the information link 18, between the hybrid control unit 13 and the charger control unit 17 as mentioned above.

The hybrid control unit 13 may request a particular charging pattern from said charging control unit 17. As mentioned above, the term "charging pattern" refers to a given charging sequence with a certain charging current and voltage, which is carried out during a certain time or until a certain state of charge has be fulfilled by the energy storage system 7. When a request for a certain charging pattern is initiated, the hybrid control unit 13 and the charging control unit 17 are arranged so that the control signal is transmitted between the hybrid control unit 13 and the charging control unit 17. For this reason, and as indicated in FIG. 2, the hybrid control unit 13 comprises a transmitter unit 13a which communicates with a receiver unit 17a in the charger control unit 17. Also, the charging control unit 17 comprises an evaluation unit 17b which is configured for determining whether the control signal is actually received by the charging control unit 17.

Preferably, information can be sent from the hybrid control unit 13 to the charger control unit 17 (as explained above and as shown in FIG. 2), but the transmission can be carried out in the opposite direction as well.

The control signal comprises data which is related to the charging of the energy storage system 7 and which defines the requested charging pattern. The control signal is also configured so as to be used for evaluating whether the charging is erroneous in any way. For example, during the charging of the energy storage system 7, there may be a risk that there may occur events which may lead to a risk for personal injury or damage to equipment. For example, if the position of the bus 1 should suddenly change, this could be regarded as a serious safety risk if its connector element 9 (i.e. the pantograph) should come into contact with persons or objects in an unwanted manner while it is still in electrical contact with the energy storage system 7.

For this reason, it is a principle behind the invention that the vehicle control unit 8 is arranged for controlling the transmission of the control signal and in particular for ending the transmission if there exists any errors which may affect the charging in a negative manner. Also, the external power supply 11 is configured so as to evaluate whether the control signal is actually received by means of the receiver unit 17a. Furthermore, in the event that the control signal is not received by said external power supply 11, the charging is terminated by the external power supply. This is in order to eliminate the risk for any injuries or damage. This will be described in greater detail below.

A process for charging the energy storage system 7 in accordance with the invention will now be described with reference to the flow chart of FIG. 3.

A first step by means of which the method according to the invention is started is the connection of the connector elements 9, 10, as described above. In case the connector element 9 of the bus is a pantograph and the connector element 10 of the external power source is an overhead conductive wire, this first step (see reference numeral 19 in FIG. 3) corresponds to a situation in which the pantograph 9 is in a raised condition in which it is in electrically conductive contact with the overhead conductive wire 10.

Figure 3:
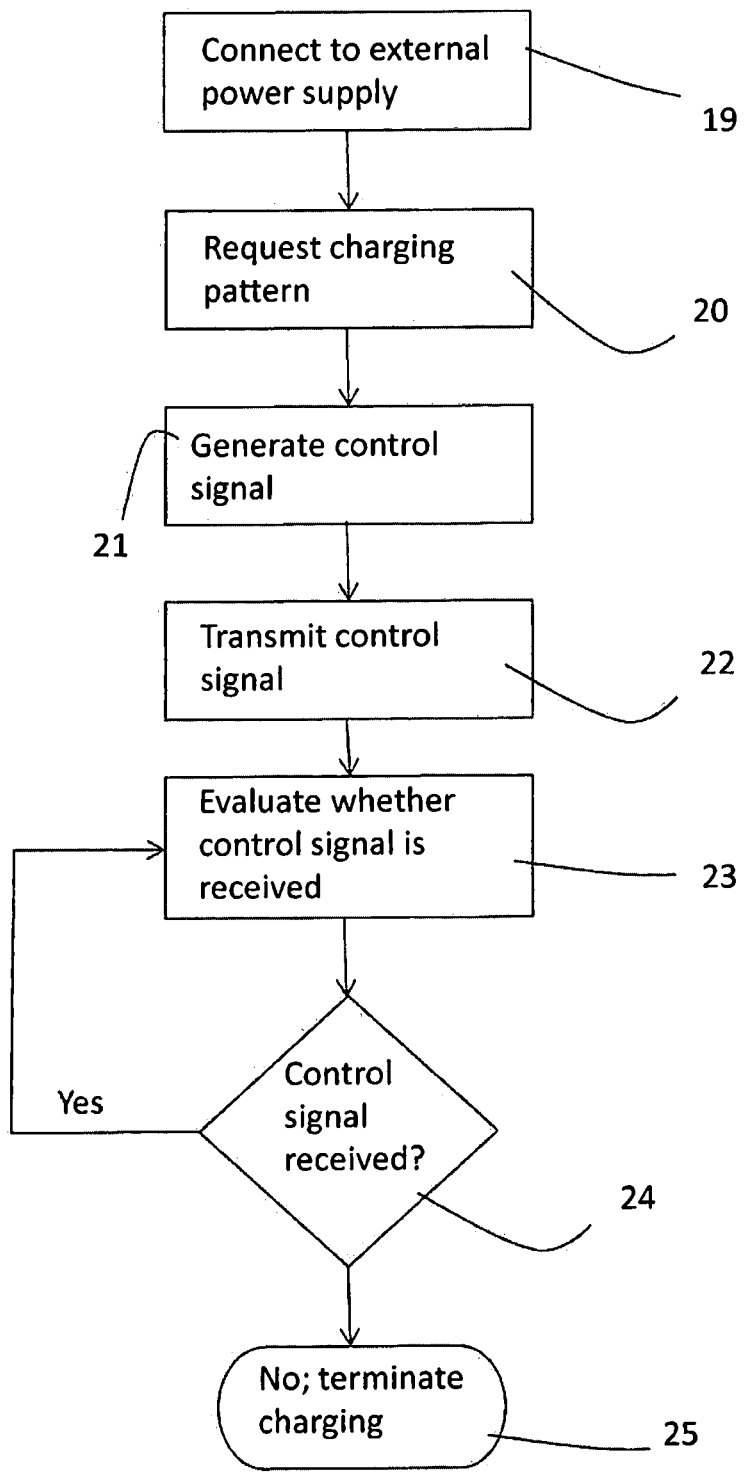
FIG. 3 is a simplified flowchart describing the principles of the invention.

When the connector elements 9, 10 are electrically connected to each other, the hybrid control unit 13 sends information to the charger control unit 17 corresponding to a request to supply charging in the form of a predetermined charging pattern (step 20 in FIG. 3). As explained above, such a charging pattern can for example be in the form of a "quick charge", i.e. involving a high charging current during a relatively short time period, or a "standard charge", i.e. involving a relatively low charging current during a relatively long time period. The charging pattern chosen depends on several factors, such as the available time for charging, the actual state of charge of the energy storage system 7 and the available power from the external power supply 11.

Information with a request for a charging pattern is transmitted on the information link 18, which according to the invention is at least partly wireless. Suitably, the information link 18 is a wireless connection at least from the bus 1 to the external power supply 11 (as schematically indicated in FIG. 1). In most applications, it can be expected that the bus 1 and the external power supply 11 are located within a close distance from each other, typically 5-20 meters. For this reason, the wireless connection can be obtained by means of a short-range radio connection link and may also be, for example, a Bluetooth or Zigbee communication link.

In connection with the charging of the energy storage system 7, the above-mentioned control signal is generated by means of the hybrid control unit 13 (step 21). The control signal comprises data related to the charging procedure which is transmitted from the transmitter unit 13a forming part of the hybrid control unit 13 to the receiver unit 17b forming part of the charging control unit 17 (step 22).

It is an important feature of the invention that the evaluation unit 17b is arranged for evaluating whether the transmitted control signal is actually received in the charging control unit 17 (step 23). This determines whether there are any potential risks related for example to personal safety associated with the charging. Such risks are considered to exist if the control signal is not received by the receiver unit 17a in the charger control unit 11 (step 24).

If the evaluation in the evaluation unit 17b results in an indication that the control signal is not received by the receiving unit 17a, this is interpreted as an erroneous charging (step 25) or that some risk exists in connection with the charging process. For this reason, the charging control unit 17 will terminate the charging procedure.

It should be mentioned that in some applications, so-called pre-charging of the energy storage system 7 is carried out. This is a method, which is previously known as such, of limiting the current flowing from the external power supply 1 to the capacitive input of the energy storage system 7 during power up. According to the embodiment shown in the drawings, such a pre-charging is suitably carried out before the actual main charging according to the predetermined charging pattern is initiated.

As described above, the control signal is transmitted by means of the wireless connection 18 from the bus 1 to the charger control unit 17. According to an embodiment, the control signal is provided in the form of a modulated radio signal which is transmitted by means of the radio transmitter unit 13a which forms part of the hybrid control unit 13. Furthermore, the modulated radio signal is received by means of the radio receiver unit 17a in the charger control unit 17.

The control signal can be provided in different forms. According to an embodiment, the control signal is a generally continuous signal having a predetermined frequency and/or amplitude. Such a signal can be received by the radio receiver unit 17a and be evaluated in the evaluation unit 17b. Alternatively, the control signal can be a generally pulse-shaped signal with a predetermined pulse width and/or amplitude. According to a further embodiment, the control signal can be a repeated sequence of signals as described above which can be transmitted with a pause of predetermined length between signal bursts. In summary, the invention can be implemented with several types of signal parameters forming the control signal.

Suitably, the control signal comprises data representing at least the type of charging which is requested when the bus 1 is arranged so that the connectors 9, 10 are connected to each other. According to an embodiment, the data related to the charging also comprises information concerning at least one of the following parameters:

i) the current position of said vehicle (1);
ii) any occurrence of movement of said vehicle (1);
iii) the identity of said vehicle (1);
iv) the electrical isolation of said electrical storage system (7);
v) the status of contact elements of high voltage components of said vehicle;
vi) the charging current;
vii) the charging voltage; and
viii) the temperature of said connector elements;

if at least one of the above-mentioned parameters deviates from a certain set value, which is determined in the vehicle control unit 8, the transmission of the control signal from the hybrid control device 13 should be terminated. For example, if the position of the bus 1 should suddenly change, this could be regarded as a serious safety risk since its connector element 9 (i.e. the pantograph) may come into contact with persons or objects in an unwanted manner. Since the pantograph 9 is connected to the energy storage system 7—which during charging may have a voltage of several hundred volts—such a situation could be extremely dangerous. For this reason, the invention is based on the principle that any of the above-mentioned deviations of the parameters i)-viii) will cause the control signal to be terminated, i.e. the transmission of the control signal will cease. This is detected by the evaluation unit 17b of the charger control unit 17. In this way, the charging of the energy storage system 7 is terminated. Similar situations may occur if any of the other above-mentioned parameters should be different from what can be expected. Consequently, all these parameters represent situations which can constitute risks as regards personal safety and damage to property.

Regarding point ii) above, as an example, it can be noted that one way of solving it is to design the antennas of the vehicle and the charging station so that the transmission is interrupted if the vehicle (or at least the charging connector) is moved outside a predetermined area.

As mentioned, the invention can be arranged so that the control signal is a modulated carrier wave. According to an embodiment, the invention can be arranged so that a disruption of said carrier wave can be used in order to terminate the charging by the external power supply 11. This means a high level of safety, due to the fact that an interruption of a carrier wave can easily be detected by various electronic devices.

In the event that the evaluation unit 17b in the charging control unit 11 should detect a condition in which the control signal is missing, i.e. that the charging is terminated, the hybrid control unit 13 is according to the embodiment configured to initiate an alarm signal. Such a signal can be in a form which can be perceived for example by the driver of the vehicle 1. Alternatively, the vehicle control unit 8 may be arranged so that, in case of a discontinued control signal, the disconnector unit 15 may act so as to disconnect the connector elements 9, 10 from each other in an automatic manner. By actually disconnecting the energy storage system 7 from the external power supply 11 in the event that there exist potential risks, a very high level of safety is provided by means of the invention.

According to a particular embodiment of the invention, there is initiated a certain predetermined modulation of the requested charging pattern. The purpose of this is to enable an evaluation whether the charging supplied to said energy storage system 7 comprises said predetermined modulation; and, if this is not the case, to indicate that the charging of the electrical storage system 7 is erroneous. This is a further way of increasing the level of safety in connection with charging of the energy storage system 7. This modulation process can be actuated just before the actual charging of the energy storage system 7 is initiated by the external power source 11. At this stage, a certain predetermined modulation of the requested charging pattern is initiated. This means that the hybrid control unit 13 is configured for adding some predetermined form of variation, adjustment or modulation upon the charging current to be supplied by the external power source 1. The fact that the modulation is "predetermined" means that the hybrid control unit 13 is arranged so as to determine whether the actual charging which subsequently is received by the energy storage system 7 in the bus 1 actually corresponds to the requested charging. Such a modulation can for example be implemented by:

i) temporarily changing the frequency, amplitude or wave shape, of the charging current which is to be supplied to the energy storage system through the charging pattern;
ii) superimposing or adding, at least temporarily, a signal component to the charging current having a predetermined amplitude or frequency, or a predetermined wave shape, which can be detected by a detector in the hybrid control unit 13;

iii) otherwise changing or modulating the charging pattern in a manner which is detectable by means of the hybrid control unit 13.

When the modulation of the charging pattern has been determined and implemented by the hybrid control 13, more precisely in a modulation unit 13*b* as indicated schematically in FIG. 2, the actual pattern is initiated by supplying said charging pattern by means of the external charging control unit 11 to the energy storage system 7.

The embodiment further comprises a step of evaluating whether the charging pattern supplied to said energy storage system 7 comprises the predetermined modulation which previously had been imposed upon the charging current. This evaluation is carried out in an evaluation unit 13*c* which forms part of the hybrid control unit 13. If the evaluation results in an indication that the evaluated charging current does not comprise the modulation as implemented by means of the modulation unit 13*b*, this is interpreted as an erroneous charging.

On the other hand, if the evaluation results in an indication that the evaluated charging current in fact contains the modulation as implemented by means of the modulation unit 13*b*, this is interpreted as a correct charging. This means that the process returns to the step of evaluating the charging pattern.

The invention is not limited to the embodiment described above, but can be varied within the scope of the appended claims. For example, the transmission of the control signal can be provided both from the vehicle to the external power supply and in the opposite direction. Also, in case the control signal is constituted by a modulated radio signal, it can be detected whether the carrier wave of the radio signal is lost. This will then constitute a condition which will be regarded as corresponding to a control signal being lost.

The invention can be implemented in a manner in which the control signal is transmitted from the vehicle to the external power supply or, inversely, from the external power supply to the vehicle.

The invention claimed is:

1. Method for controlling charging of an energy storage system in a vehicle comprising an electric machine which is arranged for propulsion of the vehicle, the method comprising:
    initiating the charging upon connection of the energy storage system to an external power supply via connector elements;
    transmitting, from the vehicle to the external power supply, a control signal comprising data related to the charging by means of a wireless transmission link;
    determining, in a vehicle control unit, whether at least one parameter of the data deviates from a predetermined parameter value and, upon determining that at least one parameter of the data deviates from the predetermined parameter value, terminating transmission of the control signal;
    determining, in the external power supply, whether the control signal has not been received;
    terminating the charging upon determining that the control signal has not been received;
    providing a predetermined modulation upon a requested charging pattern;
    determining that the charging supplied to the energy storage system does not comprise the predetermined modulation; and
    indicating that the char in of the energy storage system is erroneous upon determining that the charging supplied to the energy storage system does not comprise the predetermined modulation
    wherein the data related to the charging comprises information related to at least one of the following parameters:
    i) a current position of the vehicle;
    ii) any occurrence of movement of the vehicle;
    iii) the identity of the vehicle;
    iv) electrical isolation of the energy storage system;
    v) a status of connector elements of components of the vehicle;
    vi) a charging current;
    vii) a charging voltage; and
    viii) a temperature of the connector elements.

2. Method according to claim 1, comprising
    providing the control signal in the form of a modulated radio signal transmitted by means of a radio transmitter unit in the vehicle; and
    receiving the control signal by means of a radio receiver unit in the external power supply.

3. Method according to claim 2, comprising
    transmitting and receiving the radio signal by means of a wireless short-range radio network.

4. Method according to claim 2, comprising
    terminating the charging upon detecting that a carrier wave of the modulated radio signal is interrupted.

5. Method according to claim 1, wherein the control signal is provided in at least one of the following forms:
    i) a generally continuous signal having a predetermined frequency and/or amplitude;
    ii) a generally pulse-shaped signal with a predetermined pulse width and/or amplitude; and
    iii) a repeated sequence comprising a signal as defined in i) or ii) and a pause of predetermined length.

6. Method according to claim 1, wherein the parameter corresponding to any occurring movement of the vehicle is determined by detecting whether the vehicle, or any part thereof, is located within a predetermined area or section.

7. Method according to claim 1, comprising
    detecting that the charging has been terminated due to the control signal not being received; and
    generating an alarm signal upon detecting that the charging has been terminated due to the control signal not being received.

8. Method according to claim 1, comprising
    detecting that the charging has been terminated; and
    disconnecting the energy storage system from the external power supply upon detecting that the charging has been terminated.

9. An arrangement for controlling charging of an energy storage system in a vehicle comprising an electric machine which is arranged for propulsion of the vehicle, the arrangement comprising
    an external power supply arranged for initiating charging upon connection of the energy storage system to the external power supply via connector elements, and
    a transmitter unit and receiver unit for wirelessly transmitting a control signal comprising data related to the charging from the vehicle to the external power supply,
    wherein the arrangement is configured for determining, in a vehicle control unit, that at least one parameter of the data deviates from a predetermined parameter value and, upon determining that at least one parameter of the data deviates from the predetermined parameter value, terminating transmission of the control signal, for determining, in the external power supply, that the control signal has not been received in the receiver unit, and for terminating the charging upon determining that the control signal has not been received;

wherein the data related to the charging comprises information related to at least one of the following parameters:

i) a current position of the vehicle;
ii) any occurrence of movement of the vehicle;
iii) the identity of the vehicle;
iv) electrical isolation of the energy storage system;
v) a status of connector elements of the vehicle;
vi) a charging current;
vii) a charging voltage; and
viii) a temperature of the connector elements, a wherein the control unit comprises a modulation unit for applying a predetermined modulation upon a requested charging pattern and an evaluation unit for determining whether the charging supplied to the energy storage system comprises the predetermined modulation and indicating that the charging of the energy storage system is erroneous upon determining the charging supplied to the energy storage system does not comprise the predetermined modulation.

10. Arrangement according to claim 9, comprising a transmitter unit for providing the control signal in the form of a modulated radio signal, and a radio receiver unit in the external power supply for receiving the control signal.

11. Arrangement according to claim 10, wherein the radio transmitter unit and radio receiver unit form part of a wireless short-range radio network.

12. Arrangement according to claim 9, wherein the control unit is configured for determining that the charging has been terminated due to the control signal not being received, and for generating an alarm signal upon determining that the charging has been terminated due to the control signal not being received.

13. Arrangement according to claim 9, wherein the control unit is configured for determining that the charging has been terminated, and for disconnecting the energy storage system from the external power supply upon determining that the charging has been terminated.

14. Arrangement according to claim 9, wherein the connector elements are constituted by conductive or inductive connector elements associated with the vehicle and the external power supply, respectively.

15. Arrangement according to claim 14, wherein the connector elements comprises a pantograph on the vehicle.

16. Arrangement according to claim 9, wherein the energy storage system comprises a battery unit.

* * * * *